DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JULY 20, 1971

888 O.G. 705

T888,006
TOBACCO SMOKE FILTER
Gerald P. Morie, 2317 Briarcliff Road, Kingsport, Tenn. 37660
Filed Sept. 21, 1970, Ser. No. 74,238
**Int. Cl. A24d *1/06***
U.S. Cl. 131—266
No Drawing. 8 Pages Specification

Tobacco smoke filter comprising cross-linked homopolymers and copolymers prepared from monomers having the formula

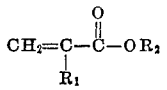

wherein $R_1$ is hydrogen or methyl and $R_2$ is an alkyl group containing 1–8 carbon atoms or a hydroxyl group attached to an alkyl group having 1–8 carbon atoms. The polymers are characterized by a macroreticular structure, a size of about 20 to about 200 mesh, surface area of about 100 to about 500 m.$^2$/g., and pore diameters of about 10 A. to about 300 A. The filters may be three component filters in which the polymeric material is packed between two plugs of filter material or the polymeric material may be added to tow which is then formed into filter rods.